US012511438B2

(12) United States Patent
Yarbrough et al.

(10) Patent No.: US 12,511,438 B2
(45) Date of Patent: Dec. 30, 2025

(54) DYNAMIC PROVISION OF SOFTWARE APPLICATION FEATURES

(71) Applicant: MOTOROLA SOLUTIONS, INC., Chicago, IL (US)

(72) Inventors: Cody Yarbrough, Herring Cove (CA); Greg Conn, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 237 days.

(21) Appl. No.: 18/397,543

(22) Filed: Dec. 27, 2023

(65) Prior Publication Data

US 2025/0217516 A1 Jul. 3, 2025

(51) Int. Cl.
*G06F 21/62* (2013.01)

(52) U.S. Cl.
CPC .................. *G06F 21/629* (2013.01)

(58) Field of Classification Search
CPC ..................................................... G06F 21/629
USPC ......................................................... 726/28
See application file for complete search history.

(56) References Cited

U.S. PATENT DOCUMENTS

| 8,935,429 | B2 * | 1/2015 | Wilkinson | G06F 8/65 709/219 |
|---|---|---|---|---|
| 9,594,778 | B1 | 3/2017 | Goodwin et al. | |
| 10,142,454 | B2 | 11/2018 | Johnson et al. | |
| 10,908,864 | B2 | 2/2021 | Bernstein et al. | |
| 2009/0265646 | A1 | 10/2009 | Cho et al. | |
| 2010/0325203 | A1 | 12/2010 | Park et al. | |
| 2013/0159984 | A1 * | 6/2013 | Misovski | G06F 8/60 717/168 |

(Continued)

FOREIGN PATENT DOCUMENTS

GB 2415274 A 12/2005

OTHER PUBLICATIONS

Wettinger et al., "Dyn Tail—Dynamically Tailored Deployment Engines for Cloud Applications," 2015 IEEE 8th International Conference on Cloud Computing, New York, NY, USA, 2015, pp. 421-428, doi: 10.1109/CLOUD.2015.63. (Year: 2016).*

(Continued)

*Primary Examiner* — Peter C Shaw
(74) *Attorney, Agent, or Firm* — Michael Best & Friedrich LLP

(57) ABSTRACT

Examples provide a server system for dynamic provision of elements features of a software application. The server includes an electronic processor configured to receive, from a client computer, session identifier and access information of a client software session running on the client computer and determine a set of session identity factors at least including licenses, user privileges, compatibilities, and application feature availabilities associated with the client software session. The electronic processor determines, from a set of application features, a first subset of application features to which the client software session is entitled based on an intersection of availability, compatibility, user privilege, and licensing of each respective application feature. The electronic processor delivers the first subset of application features to the client software session, causing each of the first subset of application features to load and render on a user interface of the client computer.

20 Claims, 6 Drawing Sheets

(56) References Cited

U.S. PATENT DOCUMENTS

| | | | |
|---|---|---|---|
| 2013/0246513 A1* | 9/2013 | Zaveri | G06F 3/04883 |
| | | | 709/203 |
| 2013/0246932 A1* | 9/2013 | Zaveri | G06F 3/0484 |
| | | | 715/740 |
| 2017/0078449 A1* | 3/2017 | Pavlov | H04L 63/105 |
| 2020/0110592 A1* | 4/2020 | Straub | G06F 8/64 |
| 2021/0367975 A1* | 11/2021 | Wood | H04L 41/5054 |
| 2023/0104026 A1 | 4/2023 | Matli | |
| 2025/0055904 A1* | 2/2025 | Das | H04L 67/02 |

OTHER PUBLICATIONS

Abirami et al., "Streamlined Deployment and Monitoring of Cloud-Native Applications on AWS with Kubernetes Prometheus Grafana," (ICAICCIT), Faridabad, India, 2023, pp. 1149-1155, doi: 10.1109/ICAICCIT60255.2023.10465818. (Year: 2023).*

Casquina et al., "Adaptive Deployment Infrastructure for Android Applications," 2016 12th European Dependable Computing Conference (EDCC), Gothenburg, Sweden, 2016, pp. 218-228, doi: 10.1109/EDCC.2016.25. (Year: 2016).*

Singh et al., "Automated provisioning of application in IAAS cloud using Ansible configuration management," 2015 1st International Conference on Next Generation Computing Technologies (NGCT), Dehradun, India, 2015, pp. 81-85, doi: 10.1109/NGCT.2015.7375087. (Year: 2015).*

* cited by examiner

DYNAMIC PROVISION OF SOFTWARE APPLICATION FEATURES

BACKGROUND

Software is distributed and accessed in a variety of ways. In many instances, software is loaded on a client device from a server. The software is then accessed and used on the client device by a user. In some cases, certain features of the software may be disabled or made unavailable to a user via various permissions.

Figure 1:
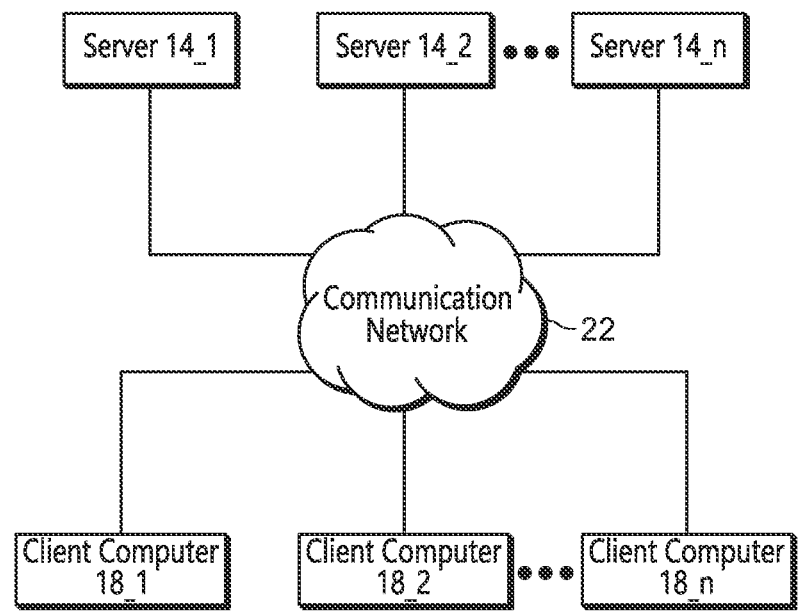
FIG. 1 illustrates a server system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

Before describing certain aspects and examples, it should be noted that in some instances, the description that follows may sometimes refer to "user" permissions and privileges. When this term or similar terminology is used it should be recognized as a shorthand way of indicating that a device that is associated with a user (for example, in the way that a smartphone or personal computer is associated with an individual) has permissions or privileges.

In traditional software delivery user interface elements and other features of a software application are downloaded or otherwise delivered to or installed on a client computer or user device regardless of user privileges and, in some cases, regardless of the processing capabilities of the client device or computing environment (for example, network connectivity). Thus, regardless of whether the features are ones that a client device has permission or capability to use, they are provided to the client device. If a client device (or in shorthand, a user) does not possess applicable access permissions or privileges, certain elements or features of the software application, for example, interface elements, are then selectively made active or hidden according to the user's privilege to access and use the interface elements. For example, a feature of an application may be restricted from a user due to insufficient user privilege, an expired or otherwise insufficient license, and/or incompatible firmware or hardware of the client computer. The restricted feature is still present on or delivered to the client computer (e.g., when the client computer connects to the server), however the restricted feature may be displayed in a manner that indicates that the user cannot access the feature (e.g., the feature is presented in grey, presented with a lock symbol, etc.). Because software code associated with the restricted feature is still present on the client computer, there is a risk that a non-privileged user may be able to, through interrogation or decompilation, trigger and interrogate calls made against an API associated with the restricted feature to which the user is not entitled to use. Additionally, providing unnecessary and restricted features to a user interface of a client computer increases complexity and load time of the client software session.

In some instances, a user may have sufficient licensing and user privileges to a feature that is known to be incompatible with the user's current client platform (e.g., browser, operating system, device, etc.). Accessing the incompatible feature may therefore cause the feature to work improperly.

Additionally, when an update to one or more features of an application is available, a user is often required to download the new release and install the update manually. Developers of the application therefore rely on the user to stay up to date with installing software updates, which often results in developers needing to support multiple versions of the same feature. Unintended interactions between different software versions of features may create problems for the user of the application and escalate costs for the user.

In some instances, such as in a cloud-enabled, multi-site, multi-system environment, a user may have privileges to use a feature that is unavailable in the local system. Conversely, a user may have privileges to use a feature that is available in the local system but for which the license has expired. In other examples, a user device may store a version of client software that is incompatible with the server to which the user is attempting to connect.

Thus, there is a need for dynamic provision of software applications elements or features (for example, user interface elements) based on user privilege, licensing, compatibility, and availability. One example provides a server system for dynamic provision of features of a software application. The server system includes a server including an electronic processor configured to: receive, from a client computer via an application programming interface ("API"), session identifier and access information of a client software session running on the client computer; determine, at least based on the session identifier and access information, a set of session identity factors at least including licenses, user privileges, compatibilities, and application feature availabilities associated with the client software session; determine, from a set of application features, a first subset of application features to which the client software session is entitled, wherein determining entitlement to each respective application feature of the first subset of application features includes determining that the set of session identity factors define sufficient licensing of the client computer to use the respective application feature, sufficient user privilege to access the respective application feature, an availability of the respective application feature, and a compatibility of the client computer with a version of the respective application feature; deliver the first subset of application features to the client software session, wherein delivery of the first subset of application features causes each of the first subset of application features to load and render on a user interface of the client computer; and prevent delivery of a second subset of application features to which the client software session is not entitled.

In some aspects, each respective application feature included in the first subset of application features is a latest version of the respective application feature that is available and compatible with the client computer.

In some aspects, the compatibilities include hardware compatibilities and software compatibilities of the client computer.

In some aspects, the software compatibilities include at least one selected from the group consisting of a browser compatibility, a browser version compatibility, an operating system compatibility, an operating system version compatibility.

In some aspects, the hardware compatibilities include at least one selected from the group consisting of a display size compatibility, a display resolution compatibility, a display orientation compatibility, and a peripheral device compatibility.

In some aspects, an availability of the respective application feature includes an availability of the respective application feature on the server and/or in a cache of the client computer.

In some aspects, the electronic processor is further configured to: responsive to determining that a network load time between the server and the client computer is greater than a threshold, deliver a cached copy of the respective application feature to the client software session.

In some aspects, delivering the first subset of application features includes delivering a location of program code of each respective application feature of the first subset of application features.

In some aspects, the electronic processor is further configured to: during runtime of the client software session, detect a change in a session identity factor, an availability of a respective application feature, and/or a version of a respective application feature; responsive to detecting the change, determine a third subset of application features to which the client software session is entitled as a result of the change; and deliver the third subset of application features to the client software session.

In some aspects, the electronic processor is further configured to: determine a fourth subset of application features to which the client software session is no longer entitled as a result of the change; and revoke the fourth subset of application features from the client software session.

In some aspects, the electronic processor is configured to receive the session identifier and access information responsive to an authentication being performed between a user of the client computer and the software client session.

In some aspects, determining entitlement to each respective application feature of the first subset of application features further includes determining a compatibility of the server with a version of the respective application feature.

In some aspects, determining entitlement to each respective application feature of the first subset of application features further includes determining that the server has sufficient licensing for the respective application feature.

In some aspects, the electronic processor is further configured to: receive, from a second client computer via the API, second session identifier and access information of a second client software session running on the second client computer; determine, at least based on the second session identifier and access information, a second set of session identity factors different from the set of session identity factors; determine, from the set of application features, a third subset of application features to which the second client software session is entitled, the third subset of application features being different from the first subset of application features; deliver the third subset of application features to the second client software session; and prevent delivery of a fourth subset of application features to which the second client software session is not entitled.

In some aspects, the server system further includes: a second server including a second electronic processor configured to: receive, from the first client computer via the API, the session identifier and access information of the client software session running on the client computer; determine, at least based on the session identifier and access information, a second set of session identity factors different from the set of session identity factors; determine, from a second set of application features, a third subset of application features to which the client software session is entitled, the third subset of application features being different from the first subset of application features; deliver the third subset of application features to the client software session; and prevent delivery of a fourth subset of application features to which the client software session is not entitled.

Another example provides a method for dynamic provision of features of a software application. The method includes receiving, with a server from a client computer via an application programming interface ("API"), session identifier and access information of a client software session running on the client computer; determining, at least based on the session identifier and access information, a set of session identity factors at least including licenses, user privileges, compatibilities, and application feature availabilities associated with the client software session; determining, from a set of application features, a first subset of application features to which the client software session is entitled, wherein determining entitlement to each respective application feature of the first subset of application features includes determining that the set of session identity factors define sufficient licensing of the client computer to use the respective application feature, sufficient user privilege to access the respective application feature, an availability of the respective application feature, and a compatibility of the client computer with a version of the respective application feature; delivering the first subset of application features to the client software session, wherein delivery of the first subset of application features causes each of the first subset of application features to load and render on a user interface of the client computer; and preventing delivery of a second subset of application features to which the client software session is not entitled.

In some aspects, each respective application feature included in the first subset of application features is a latest version of the respective application feature that is available and compatible with the client computer.

In some aspects, the compatibilities include hardware compatibilities and software compatibilities of the client computer.

In some aspects, the software compatibilities include at least one selected from the group consisting of a browser compatibility, a browser version compatibility, an operating system compatibility, an operating system version compatibility.

In some aspects, the hardware compatibilities include at least one selected from the group consisting of a display size compatibility, a display resolution compatibility, a display orientation compatibility, and a peripheral device compatibility.

Examples are herein described with reference to flowchart illustrations and/or block diagrams of methods, apparatus (systems) and computer program products according to examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

Further advantages and features consistent with this disclosure will be set forth in the following detailed description, with reference to the figures.

Referring now to the drawings, FIG. 1 illustrates a server system 10, according to some examples. The system 10 includes one or more servers 14 (e.g., servers 14_1, 14_2, . . . , 14_n) communicatively connected to one or more client computers 18 (e.g., client computers 18_1, 18_2, . . . , 18_n) via a communication network 22. The communication network 22 may include a suitable wired and/or wireless network. For example, one or more of the servers 14 may be communicatively connected to one or more of the client computers 18 in a local area network (i.e., one or more servers 14 may be an on-premise server 14) or a wide area network (i.e., one or more servers 14 may be an off-premise server 14). Additionally, one or more servers 14 and/or client computers 18 may be air gapped from other servers 14 and/or client computers 18.

As will be described in greater detail below, the one or more servers 14 dynamically provide application features to a client software session running on the one or more client computers 18. As used herein, the term "features," or "application features," generally refers to self-contained semi-independent application features, such as, for example, features associated with a micro front end ("MFE") architecture or the like.

Figure 2:
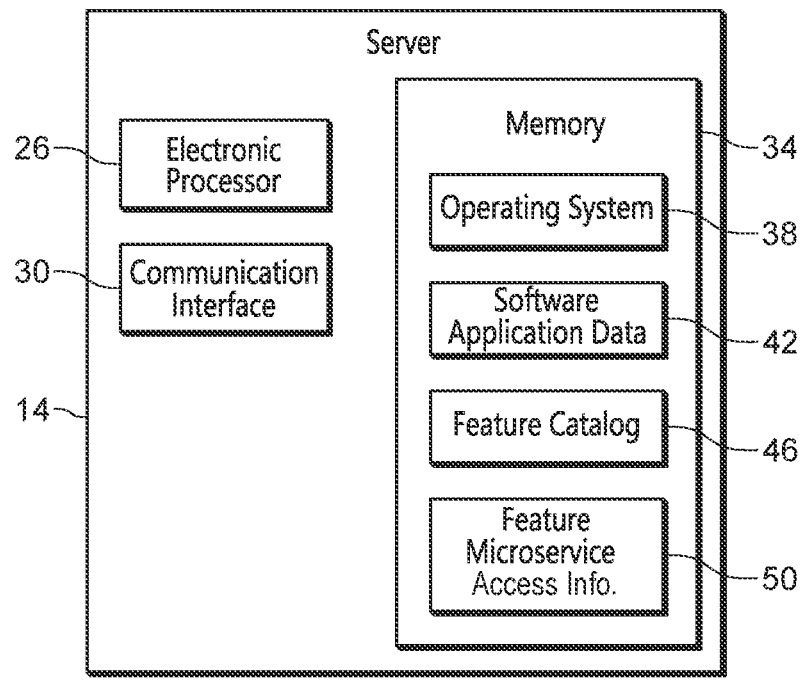
FIG. 2 illustrates a server, according to some examples.

FIG. 2 schematically illustrates an example of the one or more servers 14. For simplicity, the one or more servers 14 may be otherwise referred to herein as the server 14. The server 14 includes an electronic processor 26 communicatively connected to a communication interface 30 and a memory 34. For ease of explanation, the server 14 is described herein as including a single electronic processor 26, a single communication interface 30, and a single memory 34. However, it should be understood that the server 14 may include multiple electronic processors 26, multiple communication interfaces 30, and/or multiple memories 34. The sever 14 may reside locally with respect to one or more client computers 18, within the cloud, or be implemented in a distributed manner both locally and in the cloud.

The communication interface 30 enables the server 14 to communicate with the one or more client computers 18 by means of, for example, one or more application programming interfaces ("API") associated with an application running on the one or more client computers 18. The communication interface 30 may also enable the server 14 to communicate with other devices through the communication network 22 (e.g., developer devices, system administrators, other client computers, and/or the like).

The memory 34 may store a server operating system 38, software application data 42 used for communicating with and providing application features to the one or more client computers 18, a feature catalog 46 of features that may be available on the server 14 or elsewhere for potential provision by the server 14 to one or more client computers 18, and access information for feature microservices 50 (e.g., program code and/or locations of program code associated with respective features) that may be integrated with the one or more client computers 18 at runtime of a software application on the one or more client computers 18. Some or all of the program code associated with one or more feature microservices 50 may be stored remote from the server 14, and the server 14 may store an access location of the feature microservice 50. It should be understood that the memory 34 may store pointers to feature microservices, and that the program code associated with feature microservices may be stored internal to or external to the server 14. However, for simplicity, the feature microservice access information 50 may otherwise be referred to herein as feature microservices 50 or program code 50. Additionally, the server 14 may include more or fewer components than illustrated in FIG. 2.

Figure 3:
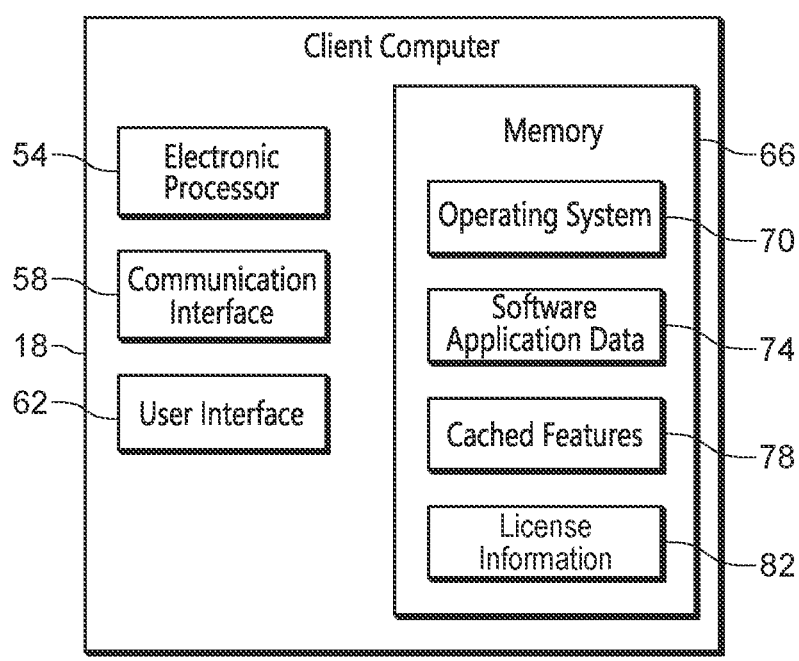
FIG. 3 illustrates a client computer, according to some examples.

FIG. 3 schematically illustrates an example of the one or more client computers 18. For simplicity, the one or more client computers 18 may be otherwise referred to herein as the client computer 18. The client computer 18 may be, for example, a mobile phone, a laptop computer, a tablet computer, a netbook computer, a personal computer (PC), a personal digital assistant (PDA), a desktop computer, or the like.

The client computer 18 includes an electronic processor 54 communicatively connected to a communication interface 58, a user interface 62, and a memory 66. For ease of explanation, the client computer 18 is described herein as including a single electronic processor 54, a single communication interface 58, a single user interface 62, and a single memory 66. However, it should be understood that the client computer 18 may include multiple electronic processors 54, multiple communication interfaces 58, multiple user interfaces 62, and/or multiple memories 66.

The communication interface 58 enables the client computer 18 to communicate with the server 14 (i.e., the one or more servers 14) by means of, for example, one or more APIs associated with one or more applications running on the client computer 18. The communication interface 58 may also enable the client computer 18 to communicate with other devices through the communication network 22 (e.g., developer devices, system administrators, other client computers 18, and/or the like).

The user interface 62 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. The user interface 62 may also include a display, indicator lights, or non-visual displays such as audio output devices, etc. The display may be a cathode ray tube (CRT), a flat-panel device, such as that using a liquid crystal display (LCD) or plasma display, a projection device, a touch screen, and the like. The user interface 62 of each client computer 18 may have various display sizes, displays screens, screen resolutions, and/or the like, which may affect how application content is presented to a user of the client computer 18.

The memory 66 may store a client computer operating system 70, client software application data 74 associated with client software to be run on the client computer 18, one or more cached application features, and information relating to licenses or other entitlements 82 (e.g., user privilege data such as administrator credentials or the like) associated with one or more application features. License data is not necessarily stored exclusively in the memory 66 of the client computer 18. For example, a particular license may be attached to a site (i.e., a server), and permissions associated with the license may be attached to the user (i.e., a user session on the client computer 18). Client software to be run on the client computer 18 may include, for example, one or more browsers, personal information management software, virtualization software, and/or the like.

Figure 4:
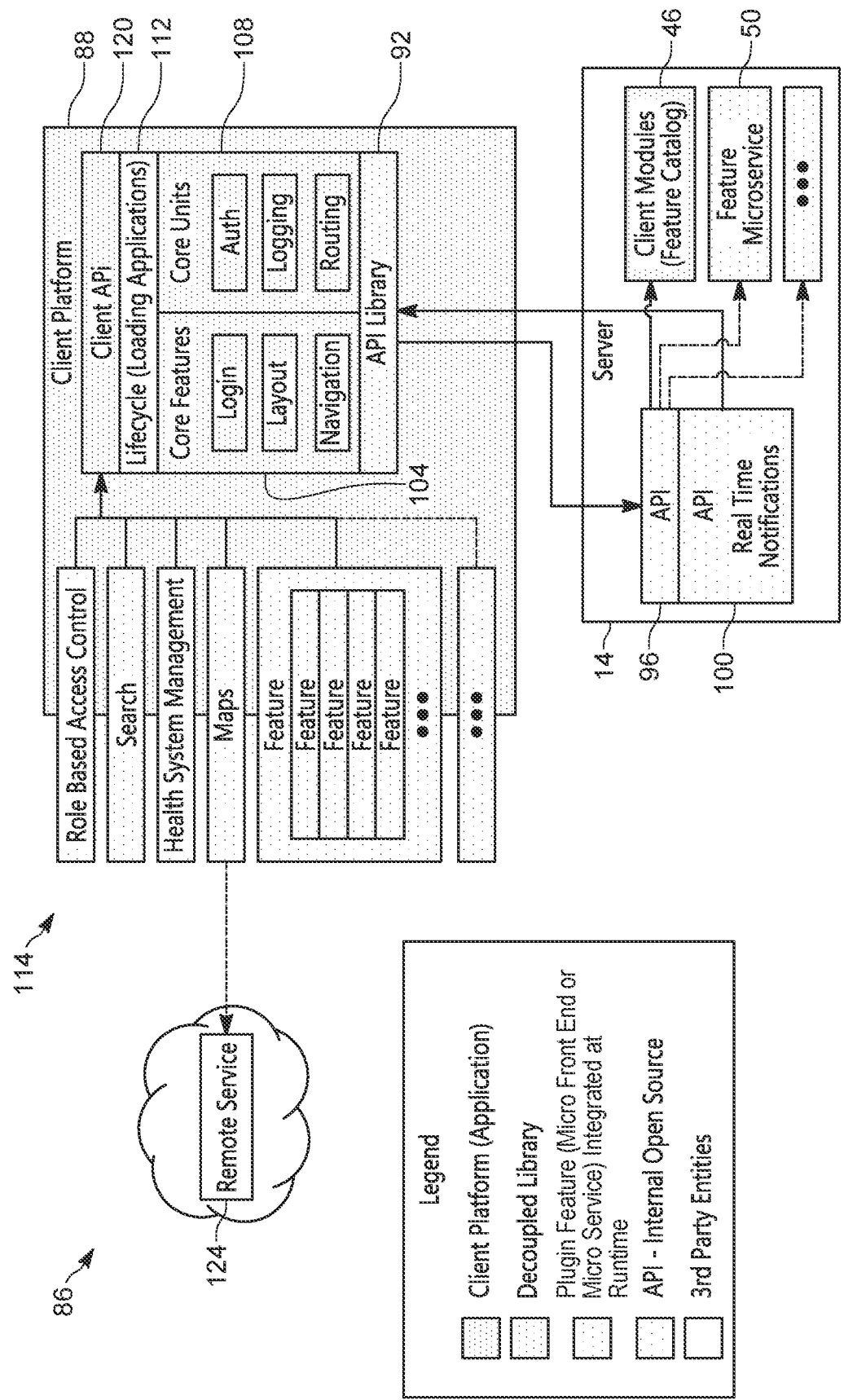
FIG. 4 illustrates workflow diagram for dynamically assembling application features for a client computer, according to some examples.

FIG. 4 illustrates an example workflow 86 for dynamically assembling application features to the client computer 18. The client computer 18 together with the operating system 70 and software application data 74 define a client platform 88. The client platform 88 may include a decoupled API library 92 for sending API calls to the server 14 (e.g., received via corresponding server-side API 96). The server 14 may similarly communicate with the client computer 18 by means of the server-side API 96, an API notifications module 100, and the API library 92.

The client platform 88 includes core features 104 and core utilities 108 used in operation of the client platform 88, such as running software applications. Core features 104 may include, for example, user credentials such as login information of a user of the client computer, application layout information defined by screen resolution, display size, application constraints, and/or the like, navigational information of the application and/or client platform 88, and/or other core features 104. Core utilities 108 may include, for example, authentication functions (e.g., generation of authentication tokens), logging, and routing.

The client platform 88 may further include an application lifecycle module 112 for loading application features, such as the features 114 illustrated in FIG. 4, responsive to the client platform 88 requesting the application features 114 from the server 14. For example, during runtime of an application, the client computer 18 may initiate a session with the server 14 and provide to the server 14, via one or more API calls, information relating to the session and the client platform 88. The information related to the session may otherwise be referred to herein as session and access identifier information.

The session identifier and access information may contain an indication of whether a logged-in session is still valid, user-specific identifiers (e.g., an access token defining a set of user privileges and/or licenses), or other information that may be used by the server 14 to determine user privileges, licenses, compatibility and/or other session information via one or more API calls. For example, the session identifier and access information may include an authentication (e.g., a user ID), sometimes referred to as authN, and an authorization (e.g., an access token), sometimes referred to as authZ.

The session identifier and access information may also contain or be used by the server 14 to determine information relating to the client platform 88, such as a type and version of the client computer operating system 70, a type and version of the client software application the client computer 18 is running (e.g., a browser version), or the like.

Based on the session identifier and access information received through the API 96, the server 14 accesses the feature catalog 46, otherwise referred to as client modules 46, for determining availability and entitlement of the client computer 18 to various application features. For example, the server 14 may have access to more application features than the features 114 that are ultimately provided to the client computer 18.

For each client computer 18 (i.e., each client platform 88) that connects to the server 14, the server 14 determines whether to provide particular application features to the client computer 18 based on an intersection of feature availability (e.g., a determination of whether program data associated with a particular feature is available to the server 14 and/or the client computer 18), compatibility (e.g., a determination of whether a particular version of the feature is compatible with the client platform 88), user privilege (e.g., a determination that a user logged into the client software session in the client platform 88 has sufficient user privileges to access the feature), and licensing (e.g., a determination that the server 14 and/or the client computer 18 have sufficient licenses to access the feature).

For example, each server 14 accessible by the client computer 18 (e.g., by means of user credentials associated with the client software session) may have a different server operating system 38, a different server operating system version, a different set of available feature microservices 50, different feature versions of the available feature microservices 50, and/or different license entitlements or permissions for various features. Additionally, a user may connect to the server 14 by means of a variety of different client computers 18 each having a different operating system 70, a different browser, different user interface display dimensions, screen size, display resolution, peripheral devices, and/or the like, which may affect compatibility of various application features. As a result, although a user may have sufficient licenses and user privileges to access a feature, the feature may not be compatible for every client platform 88 that a user uses to access the server 14.

The server 14 therefore determines which of the available application features are compatible with the currently connected software session of the client computer 18 and provides the client computer 18 with only the compatible features to which the user is entitled. In some instances, the client platform 88 may be compatible with multiple versions of an application feature. In such instances, the server 14 provides the client platform 88 with the latest version of the application feature to which the client computer 18 is entitled.

Availability of a particular application feature on the server 14 may not necessarily require the program code of the application feature to be stored on the server 14. For example, program code for a feature may be accessible by the server 14 but stored remote from the server 14. Additionally, in some instances, the server 14 may determine that a feature is available when the client computer 18 stores a cached copy of the feature (e.g., in the cache 78).

Because the server 14 provides the client computer 18 with only the application features known to be compatible with the client platform 88, developers of the application features are able to incrementally roll out version updates to application features while reducing the risk that a user will access a feature version that is not yet compatible with their client platform 88.

Further, because the server 14 controls which application features are provided to the client computer 18, the user is not responsible for manually installing updates to application features. As a result, developers are able to transition users to new versions of features without the need to maintain support for many different versions of application features. The server 14 also enables developers to more quickly introduce bug fixes to application features, and also control which cross-section of users (i.e., which types of client platforms 88) have access to particular features and particular feature versions, which improves testing of new features and new feature versions.

In some instances, new features or feature versions can be rolled out mid-session to the client computer 18 without any required action by the user. Similarly, during runtime of the client software session, the server 14 may detect a change in a session's entitlement to an application feature (e.g., a license upgrade, a license expiration, a privilege change, an availability of the application feature, etc.). Responsive to detecting the change, the server 14 may modify the set of features provided to the client computer 18. For example, the server 14 may deliver an additional feature to the client computer 18, replace a version of a feature provided to the client computer 18, and/or revoke access to a feature.

Additionally, as described above, a particular server 14 may only be compatible with or otherwise have access to a particular set of application features to provide to the client computer 18. However, as described above, each client computer 18 may connect to multiple servers 14. As a result, the application features 114 that are received by the client computer 18 and to which the user is entitled may be dynamically provided by multiple servers 18. For example, a first server 14_1 may provide a first client computer 18_1 with a first subset of application features, and a second server 14_2 may provide the first client computer 18_1 with a second subset of application features different from the first subset of application features. Similarly, a first server 14_1 may provide a first client computer 18_1 with a first subset of application features, and provide a second client computer 18_2 with a second subset of application features (different from the first subset of application features).

For each client computer 18 accessible by a user with a single user credential (i.e., a single user that may work on multiple client computers 18 over time), the user may easily switch between client computers 18 while encountering only the most compatible feature version for each device and to which they are permitted from among the set of application features that the server 14 is entitled to access and provide.

Delivery of the application features 114 by the server 14 causes the application features 114 to be loaded to the client computer (e.g., via the lifecycle module 112) and rendered on the user interface 62 (e.g., a display of the user interface 62) of the client computer 18. In other words, the server 14 dynamically assembles a graphical user interface for the client computer 18 based on the features 114 provided to the client computer 18. In some instances, one or more features 114 (e.g., the "Maps" feature illustrated in FIG. 4) are connectable to and interact with other services, such as a cloud-based remote service 124.

Delivering the features 114 to the client computer 18 may include delivering the program code of one or more of the features 114 to the client computer 18 and/or delivering a location of the program code of one or more of the features 114. In some instances, such as when the server 14 determines that a network load time is greater than threshold, delivering one or more of the features 114 to the client computer 18 includes delivering a cached copy of the one or more features 114 (e.g., by sending a command to the client computer 18 to access the cached copy of the one or more features).

The server 14 prevents delivery of application features to which the session of the client platform 88 is not entitled. Preventing delivery of such restricted features not only prevents the feature from rendering on a graphical user interface of the client computer 62, but also prevents program code associated with the restricted application feature from being provided to or otherwise accessed by the client computer 18.

By providing the client computer 18 with only the application features to which the user is entitled based on the active session and preventing delivery of the application features to which the client computer 18 is not entitled, the server 14 enables applications and application features to load more quickly on client computers 18, reduce visual clutter on the user interface 62, and reduces a risk that a user of the client computer 18 may interact with a feature that should otherwise be inaccessible to the feature.

After delivery of the application features 114, the client computer 18 may disconnect the session from the server 14 and operate independently therefrom using the software client application.

Figure 5:
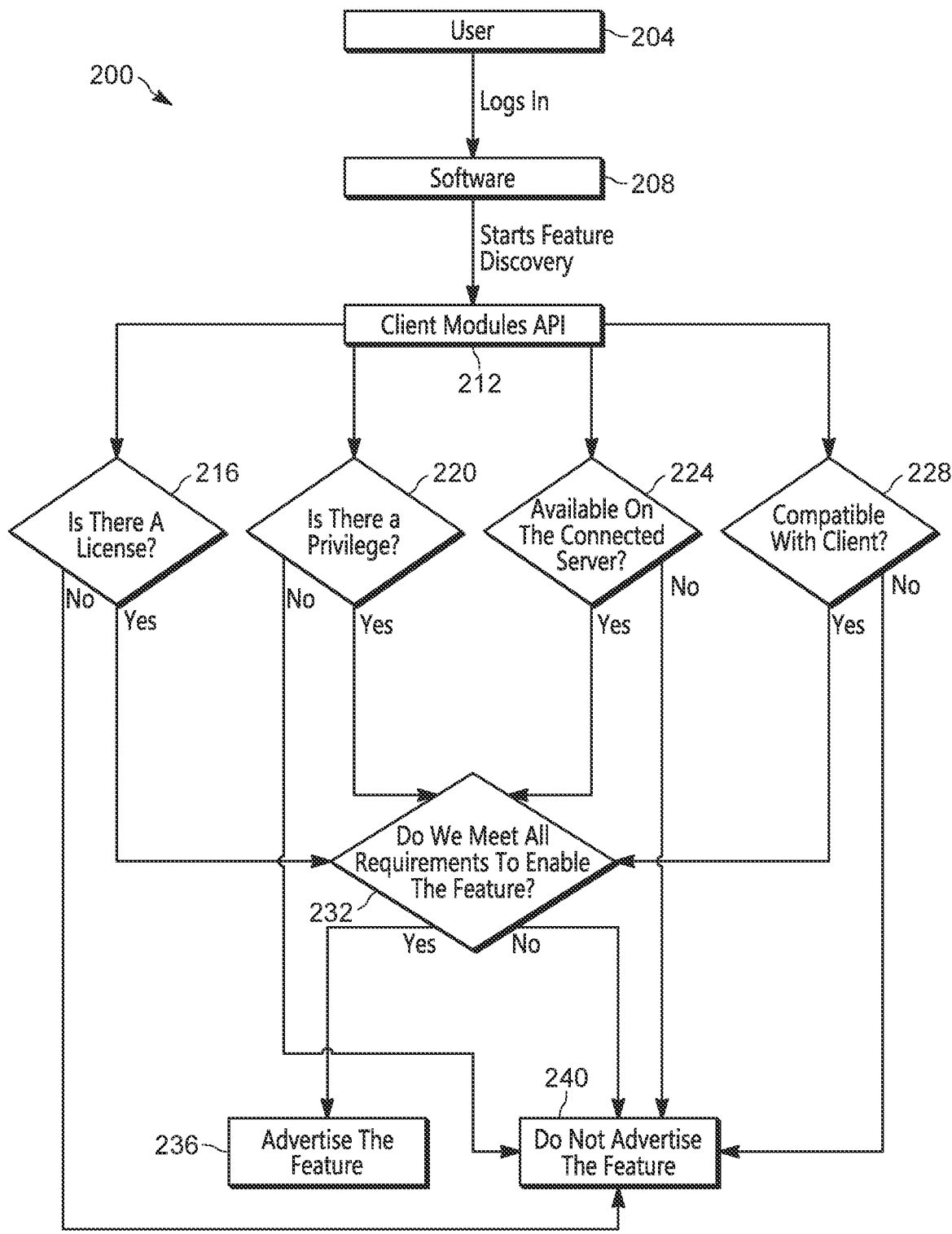
FIG. 5 illustrates a first, parallelized example method for dynamically providing application features to a client computer, according to some examples.

FIG. 5 illustrates a first example method 200 for dynamic provision of software application features, according to some examples. The method 200 includes receiving, at the client computer 18, login credentials from a user (at block 204), and responsive to receiving the login credentials and authenticating the user, initiating a client software session with the server 14 by, for example, providing the server 14 with session identifier and access information (at block 208).

Using session information received from the client computer 18, the server 14 initiates a feature discovery procedure using the feature catalog 46 (at block 212). During the feature discovery procedure, the server 14 determines, for each respective application feature of a set of application features defined by the feature catalog 46, whether the session with the client computer 18 has sufficient licensing for the respective feature (at block 216), whether the session includes sufficient user privileges to access the respective application feature (at block 220), whether the respective application feature is available on the connected server 14

(at block 224), and whether the respective feature is compatible with the client platform 88 (at block 228).

Responsive to determining licensing, user privilege, availability, and compatibility of the respective feature, the server 14 determines whether all of these requirements, (i.e., licensing, user privilege, availability, and compatibility) are satisfied for the respective feature (i.e., that the server 14 determines "YES" to each of blocks 216-228) (at block 232). When the server determines "NO" to any of blocks 216-228, or otherwise determines that all of the requirements are not met ("NO at block 232), the server 14 does not provide, display, or otherwise advertise the respective application feature to the client computer 18 (at block 236).

In contrast, when the server 14 determines that all requirements for the respective feature are met (i.e., the session identity information indicates sufficient licensing for the respective feature, sufficient user privilege for the respective feature, availability of the respective feature, and compatibility of the respective feature with the client platform 88), the server 14 delivers the respective feature to the session running on the client computer 18 (at block 240). The server 14 may determine entitlement to respective application features based on factors other than licensing, privilege, availability, and compatibility. For example, additional requirements may be selected automatically by the server 14 and/or selected by a user of the server, such as a system administrator or an individual with sufficient user privileges to modify the session identity factors.

Figure 6:
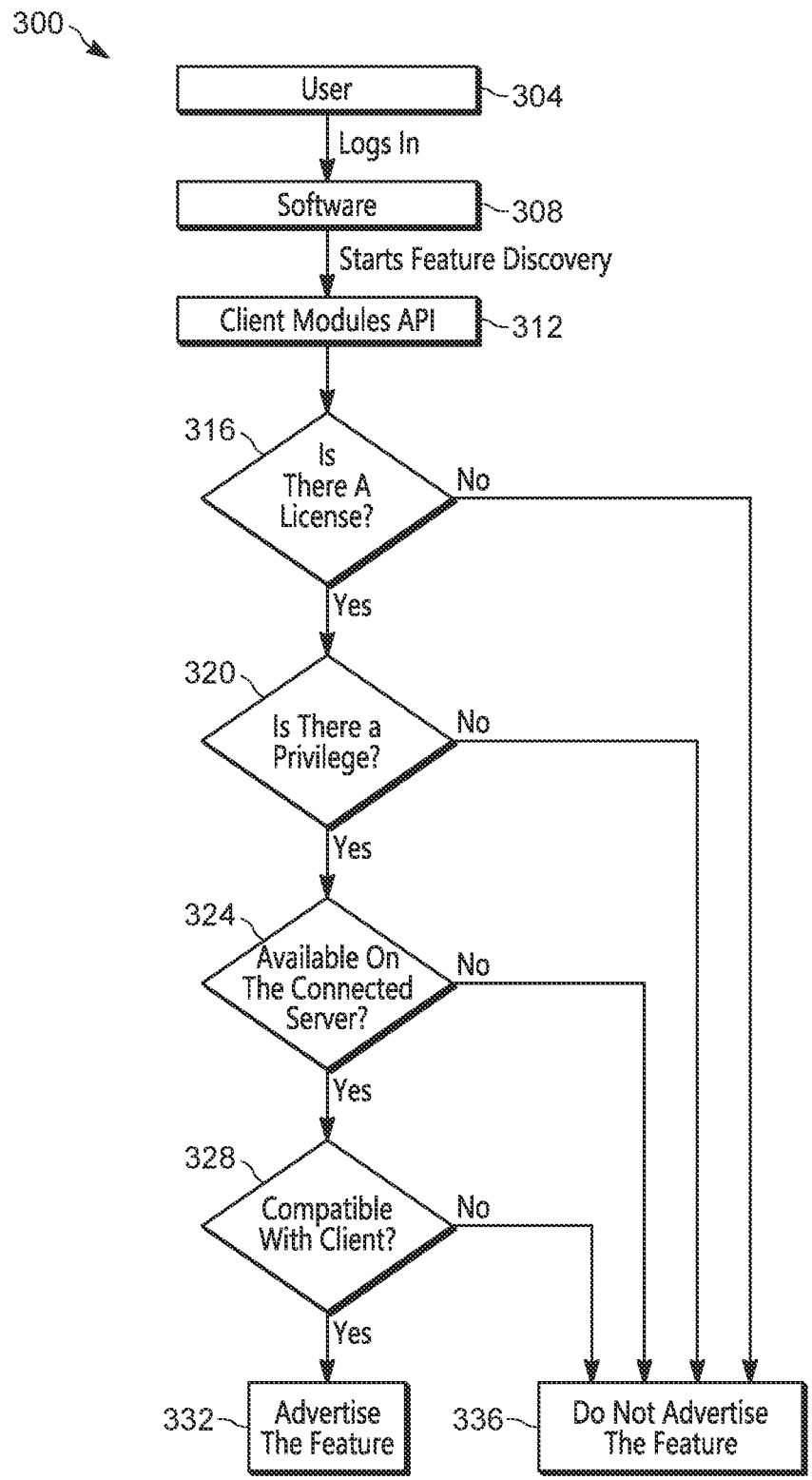
FIG. 6 illustrates a second, serialized example method for dynamically providing application features to a client computer, according to some examples.

While the method 200 of FIG. 5 describes and illustrates the determination of entitlement requirements for a feature being performed in parallel, in some examples, such as the example method 400 described in FIG. 6, the server 14 sequentially determines whether each entitlement requirement is met. For example, operations performed at blocks 304, 308, and 312 of the method 300 may be substantially similar to operations performed at blocks 204, 308, and 312 of the method 300, respectively.

During feature discovery, for each respective feature, the server 14 may first determine whether a first requirement is met (e.g., sufficient licensing) (at block 316). When the server 14 determines that the first requirement is met ("YES" at block 316), the server proceeds to determine whether a second requirement is met for the respective feature (e.g., sufficient user privilege) (at block 320). When the server 14 determines that the second requirement is met, the server 14 proceeds to determine whether a third requirement is met (e.g., availability of the respective application feature on the server 14) (at block 324). When the server 14 determines that the third requirement is met ("YES" at block 324), the server 14 proceeds to determine whether a fourth requirement is met for the respective application feature (e.g., compatibility) (at block 328). When the server 14 determines that the fourth requirement is met ("YES" at block 328), the server 14 delivers the application feature to the client computer (at block 332).

In contrast, when the server 14 determines that any requirements are not met (i.e., when the server 14 determines "NO" at any one of blocks 316-328), the server 14 does not proceed to determine whether other requirements the respective application feature are met, and instead prevents delivery of the respective application feature (at block 336). For example, when the server 14 determines that session does not have sufficient licensing to use the respective application feature ("NO" at block 316), the server 14 does not perform the operations of blocks 320-328.

The method 300 of FIG. 6 is not limited to the illustrated order of operations. For example, the server 14 may determine whether a feature is available on the server 14 before determining whether the user has sufficient privileges for the feature. In some instances, the server 14 may determine whether additional requirements for the respective feature are met before delivering the respective feature to the client computer 18.

In some instances, the server 14 determines satisfaction of feature requirements sequentially (e.g., using the method 300) rather than in parallel (e.g., using the method 200) responsive to determining that a network load time is greater than a threshold, or when the server 14 determines that other network errors are present.

Figure 7:
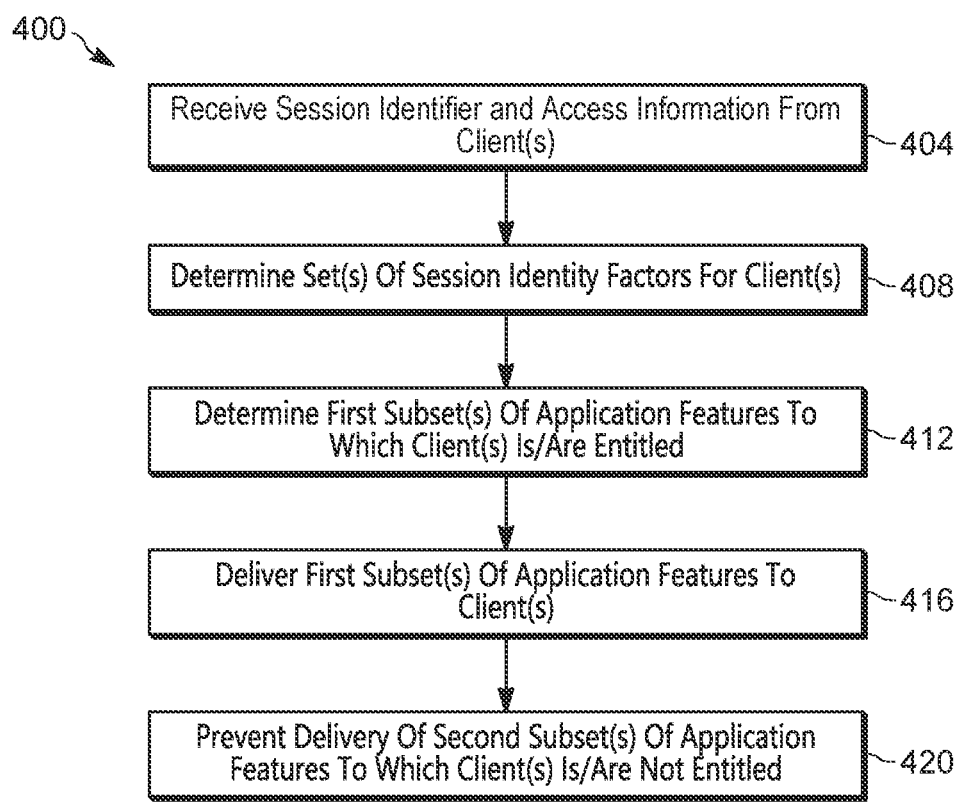
FIG. 7 illustrates a third example method for dynamically providing application features to a client computer, according to some examples.

FIG. 7 illustrates a third example method 400 for dynamically providing application features to a client computer 18. The server 14 receives, from the client computer 18 via an API (e.g., the 92), a session identifier and access information of a client software session running on the client computer 18 (at block 404). At least based on the session identifier and access information, the server 14 determines a set of session identity factors at least including licenses, user privileges, compatibilities, and application feature availabilities associated with the client software session (at block 408).

From a set of application features (e.g., from a set of application features defined by the feature catalog 36), the server 14 determines a first subset of application features to which the client software session is entitled (at block 412). Determining entitlement to each respective application feature includes, for example, determining that the set of session identity factors define sufficient licensing of the client computer to use the respective application feature, sufficient user privilege to access the respective application feature, an availability of the respective application feature, and a compatibility of the client computer with a version of the respective application feature. However, as described above, a determination of entitlement (i.e., a determination that all requirements for a respective application feature are met) may be based on additional factors, such as compatibility with the server 14, licensing by the server 14, or the like.

The server 14 delivers the first subset of application features to the client software session, which causes the application features included in the first subset to load and render on the client computer 18 (at block 416). The server 14 also prevents delivery of a second subset of application features to which the client software session is not entitled (at block 420).

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A server system for dynamic provision of features of a software application, the server system comprising:
   a server including an electronic processor configured to:
      receive, from a client computer via an application programming interface ("API"), session identifier and access information of a client software session running on the client computer;
      determine, at least based on the session identifier and access information, a set of session identity factors at least including licenses, user privileges, compatibilities, and application feature availabilities associated with the client software session, wherein each server in the server system has a different set of available features with different versions and different permissions;

determine, from a set of application features, a first subset of application features to which the client software session is entitled, wherein determining entitlement to each respective application feature of the first subset of application features includes determining that the set of session identity factors define sufficient licensing of the client computer to use the respective application feature, sufficient user privilege to access the respective application feature, an availability of the respective application feature, and a compatibility of the client computer with a version of the respective application feature;

deliver the first subset of application features to the client software session, wherein delivery of the first subset of application features causes each of the first subset of application features to load and render on a user interface of the client computer; and prevent delivery of a second subset of application features to which the client software session is not entitled.

2. The server system of claim 1, wherein each respective application feature included in the first subset of application features is a latest version of the respective application feature that is available and compatible with the client computer.

3. The server system of claim 1, wherein the compatibilities include hardware compatibilities and software compatibilities of the client computer.

4. The server system of claim 3, wherein the software compatibilities include at least one selected from the group consisting of a browser compatibility, a browser version compatibility, an operating system compatibility, an operating system version compatibility.

5. The server system of claim 3, wherein the hardware compatibilities include at least one selected from the group consisting of a display size compatibility, a display resolution compatibility, a display orientation compatibility, and a peripheral device compatibility.

6. The server system of claim 1, wherein an availability of the respective application feature includes an availability of the respective application feature on the server and/or in a cache of the client computer.

7. The server system of claim 6, wherein the electronic processor is further configured to: responsive to determining that a network load time between the server and the client computer is greater than a threshold, deliver a cached copy of the respective application feature to the client software session.

8. The server system of claim 1, wherein delivering the first subset of application features includes delivering a location of program code of each respective application feature of the first subset of application features.

9. The server system of claim 1, wherein the electronic processor is further configured to:

during runtime of the client software session, detect a change in a session identity factor, an availability of a respective application feature, and/or a version of a respective application feature;

responsive to detecting the change, determine a third subset of application features to which the client software session is entitled as a result of the change; and deliver the third subset of application features to the client software session.

10. The server system of claim 9, wherein the electronic processor is further configured to: determine a fourth subset of application features to which the client software session is no longer entitled as a result of the change; and revoke the fourth subset of application features from the client software session.

11. The server system of claim 1, wherein the electronic processor is configured to receive the session identifier and access information responsive to an authentication being performed between a user of the client computer and the software client session.

12. The server system of claim 1, wherein determining entitlement to each respective application feature of the first subset of application features further includes determining a compatibility of the server with a version of the respective application feature.

13. The server system of claim 1, wherein determining entitlement to each respective application feature of the first subset of application features further includes determining that the server has sufficient licensing for the respective application feature.

14. The server system of claim 1, wherein the electronic processor is further configured to:

receive, from a second client computer via the API, second session identifier and access information of a second client software session running on the second client computer;

determine, at least based on the second session identifier and access information, a second set of session identity factors different from the set of session identity factors;

determine, from the set of application features, a third subset of application features to which the second client software session is entitled, the third subset of application features being different from the first subset of application features;

deliver the third subset of application features to the second client software session; and prevent delivery of a fourth subset of application features to which the second client software session is not entitled.

15. The server system of claim 1, further comprising:

a second server including a second electronic processor configured to:

receive, from the first client computer via the API, the session identifier and access information of the client software session running on the client computer;

determine, at least based on the session identifier and access information, a second set of session identity factors different from the set of session identity factors;

determine, from a second set of application features, a third subset of application features to which the client software session is entitled, the third subset of application features being different from the first subset of application features;

deliver the third subset of application features to the client software session; and prevent delivery of a fourth subset of application features to which the client software session is not entitled.

16. A method for dynamic provision of features of a software application, the method comprising:

receiving, with a server from a client computer via an application programming interface ("API"), session identifier and access information of a client software session running on the client computer;

determining, at least based on the session identifier and access information, a set of session identity factors at least including licenses, user privileges, compatibilities, and application feature availabilities associated with the client software session, wherein each server in the server system has a different set of available features with different versions and different permissions;

determining, from a set of application features, a first subset of application features to which the client software session is entitled, wherein determining entitlement to each respective application feature of the first subset of application features includes determining that the set of session identity factors define sufficient licensing of the client computer to use the respective application feature, sufficient user privilege to access the respective application feature, an availability of the respective application feature, and a compatibility of the client computer with a version of the respective application feature;

delivering the first subset of application features to the client software session, wherein delivery of the first subset of application features causes each of the first subset of application features to load and render on a user interface of the client computer; and preventing delivery of a second subset of application features to which the client software session is not entitled.

17. The method of claim 16, wherein each respective application feature included in the first subset of application features is a latest version of the respective application feature that is available and compatible with the client computer.

18. The method of claim 16, wherein the compatibilities include hardware compatibilities and software compatibilities of the client computer.

19. The method of claim 18, wherein the software compatibilities include at least one selected from the group consisting of a browser compatibility, a browser version compatibility, an operating system compatibility, an operating system version compatibility.

20. The method of claim 18, wherein the hardware compatibilities include at least one selected from the group consisting of a display size compatibility, a display resolution compatibility, a display orientation compatibility, and a peripheral device compatibility.

* * * * *